United States Patent

Hartman

[11] 3,932,745
[45] Jan. 13, 1976

[54] FAR FIELD CONSTRUCTION FOR OPTICAL FOURIER TRANSFORMS

[75] Inventor: Richard L. Hartman, Huntsville, Ala.

[73] Assignee: The United States of America as represented by the Secretary of the Army, Washington, D.C.

[22] Filed: Sept. 30, 1974

[21] Appl. No.: 510,519

[52] U.S. Cl. ............... 250/216; 250/203; 343/17.7; 356/4; 356/6
[51] Int. Cl.² .................................. G01C 25/00
[58] Field of Search ........... 250/216, 203; 356/4, 5, 356/6; 343/17.7

[56] References Cited
UNITED STATES PATENTS
3,001,079  9/1961  Straub ............................ 250/216
3,601,488  8/1971  Ripart ............................ 356/6

Primary Examiner—Archie R. Borchelt
Assistant Examiner—E. R. La Roche
Attorney, Agent, or Firm—Nathan Edelberg; Robert P. Gibson; James T. Deaton

[57] ABSTRACT

An optical reflective device for reflecting electromagnetic energy such as laser energy into a two-way spatial transform apparatus and onto a target for reflecting the energy back to the transform apparatus and onto a detector in an off-set input transform plane to cause far field pattern of the target to be located on the detector. Transmissive optics as well as reflective optics can be used in the optical reflective device.

10 Claims, 5 Drawing Figures

FAR FIELD CONSTRUCTION FOR OPTICAL FOURIER TRANSFORMS

BACKGROUND OF THE INVENTION

An important criterion for measurements of Radar and Laser Radar (LADAR) is that the test target be in the "far field" of the transmitter, and the receiver be in the "far field" of the target. In the "far field" all paths of microwave or light waves are parallel. The required range can be deduced to be $$R = D^2/L$$

where R is the range to the far field, D is the transmitter antenna size, and L is the wavelength of the radiation. With microwave radar, the state-of-the-art has been to provide a physical spacing sufficient to meet this condition. However, the very short wavelength (L) associated with LADAR means that the far field is at a long range, e.g., 100km for the case of a one meter aperture at 10.6 micron wavelength. This means that controlled measurements of test targets can be as difficult as operating an actual system.

Various proposals to make laser signature measurements have included either ignoring the errors due to the violating far field requirement, operating only with sub-scale targets, or such expensive approaches as flying the targets in balloons at 100,000 feet. It suffices to say that the state-of-the-art prior to this invention offered no satisfactory solution to the problem.

Therefore, it is an object of this invention to make possible the measurement of the far field properties of full scale LADAR targets.

Another object of this invention is to make it possible through appropriate use of optics to make laser signature measurements with Fourier Transforms.

Still another object of this invention is to generate far field information at ranges of approximately 10 meters.

Still another object of this invention is to provide an optical reflective device that can be placed inside in a controlled environment so that more accurate data can be obtained in all weather conditions.

Still another object of this invention is to provide an optical reflective device which needs no airborne or balloon instrumentation and there is no requirement for the development of pointing and tracking systems just to make static measurements.

SUMMARY OF THE INVENTION

In accordance with this invention, an optical reflective device is provided that includes a laser source mounted relative to a first optical device so as to illuminate said device and cause laser energy to be transmitted therefrom in a back focal plane and to be focused onto a second optical device mounted relative to said first optical device to receive said laser energy in a front focal plane of the second optical device. A target is mounted in a back focal plane of the second optical device and a beam splitter is mounted between said first and second optical device so that laser energy reflected from said target and onto said beam splitter will be displayed on the detector in forms of far field pattern of the target.

DESCRIPTION OF THE PREFERRED EMBODIMENTS

Figure 1:
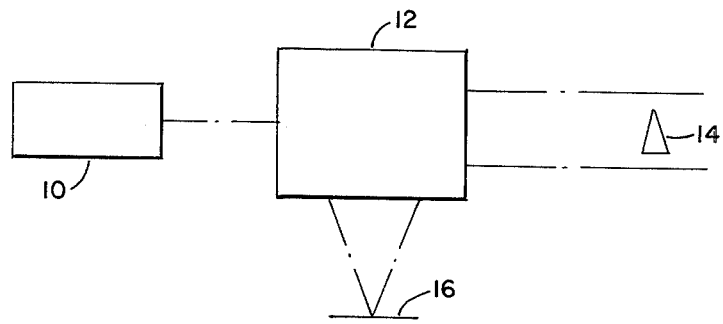
FIG. 1 is a block diagram of the optical reflective device according to this invention.

Referring now to FIG. 1, a block diagram illustration of the invention is depicted which includes an electromagnetic energy source 10 such as a laser that delivers electromagnetic energy to two-way spatial transform apparatus 12 with a target 14 placed in the output transform plane from two-way spatial transform apparatus 12 and a detector 16 in an off-set input transform plane. The details and operation of the two-way spatial transform apparatus is more particularly described hereinbelow.

Figure 2:
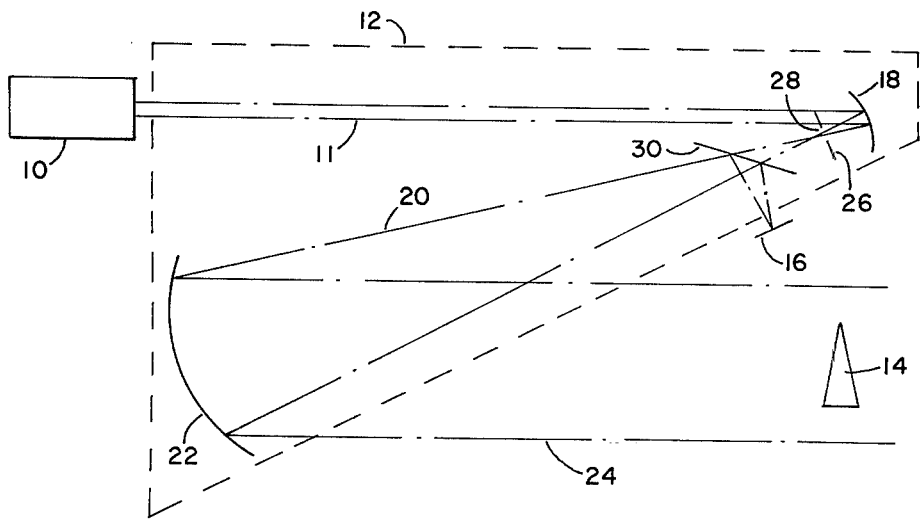
FIG. 2 is a diagrammatic optical layout with reflective optics according to this invention.

Referring now to FIG. 2, this embodiment utilizes laser source 10 and a two-way spatial transform apparatus 12 that utilizes reflective optics. Laser source 10 transmits a beam 11 onto converging mirror 18 and mirror 18 reflects beam 11 away in a back focal plane in the form of illustrated beam 20 to converging mirror 22. Mirror 22 receives beam 20 in its front focal plane and reflects beam 24 away toward target 14 in its back focal plane. Plate 26 with aperture or pinhole 28 is located at the point of convergence of beam 20 and plate 26 with aperture or pinhole 28 may be omitted if desired. Pinhole 28 acts to filter out stray light when desired. A beam splitter 30 is placed between mirrors 18 and 22 so that energy reflected back from target 14 onto mirror 22 will be reflected onto off-set front focal plane detector 16 so as to dipict forms of far field pattern of the target. Mirror 22 is preferrably located one focal length from the point of convergence of beam 20 at pinhole 28 and target 14 is preferrably located approximately one focal length from mirror 22 in order to obtain accurate phase data.

In operation, laser beam 11 from laser 10 shines onto mirror 18 and is reflected through pinhole 28 as beam 20 onto the front focal plane of mirror 22 to deliver beam 24 from the back focal plane of mirror 22 to target 14. Energy from beam 24 is reflected back from target 14 to mirror 22 and onto beam splitter 30 and finally onto off-set front focal plane detector 16.

Figure 3:
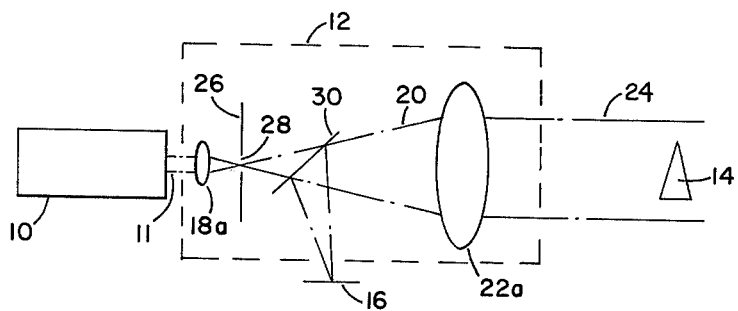
FIG. 3 is a diagrammatic illustration of an optical layout with transmissive optics according to this invention.

Referring now to FIG. 3, another embodiment of the invention is illustrated that utlizes transmissive optics in two-way spatial transform apparatus 12. Laser 10 transmits beam 11 to converging lens 18a and passes beam 20 to converging lens 22a. Plate 26 with pinhold or aperture 28 is placed in the back focal plane of lens 18a at the point of optical convergence of beam 20. Plate 26 with pinhole 28 therein may be omitted if desired, but when used, pinhole 28 filters out stray light beams. Lens 22a is mounted approximately one optical focal length from convergence of beam 20 at pinhole 28 and beam splitter 30 is mounted between plate 26 and lens 22a to reflect the returned energy onto off-set front focal plane detector 16. Lens 22a transmits beam 24 in its back focal plane to target 14 which reflects a portion of beam 24 back through lens 22a onto beam splitter 30 and finally to off-set front focal plane detector 16. Target 14 is preferrably mounted approximately one focal length from lens 22a when accurate phase data is required.

In operation, beam 11 from laser 10 shines through converging lens 18a and is focused on pinhole 28. The diverging light of beam 20 then passes through converging lens 22a and emerges as parallel beam 24 which illuminates target 14. Although the far field of element 14 as a true target is far away, with target 14 one focal length from lens 22a the illumination is a true far field function of pinhole 28. The light reflected or scattered from target 14 passes back through lens 22a, is partially reflected by beam splitter 30 and forms the far field pattern of the target on detector 16.

It should be noted that the aperture or pinhole and the target are in the focal planes of the optical elements, and thus do not form images, but instead form Fourier transformations. It has been demonstrated that the Fourier transformation converts an illumination function into its far field pattern.

An alternate way of explaining the operation is to consider that in the near field, light from two points on an aperture travels along two sides of a triangle, and thus goes different distances. When the triangle is made sufficiently long, the sides become almost parallel and are the same length within a wavelength of light. But one focal length from a converging optical element, parallel beams of light are bent to a common focus, and thus travel the same distance, satisfying the far field criterion.

Figure 4:
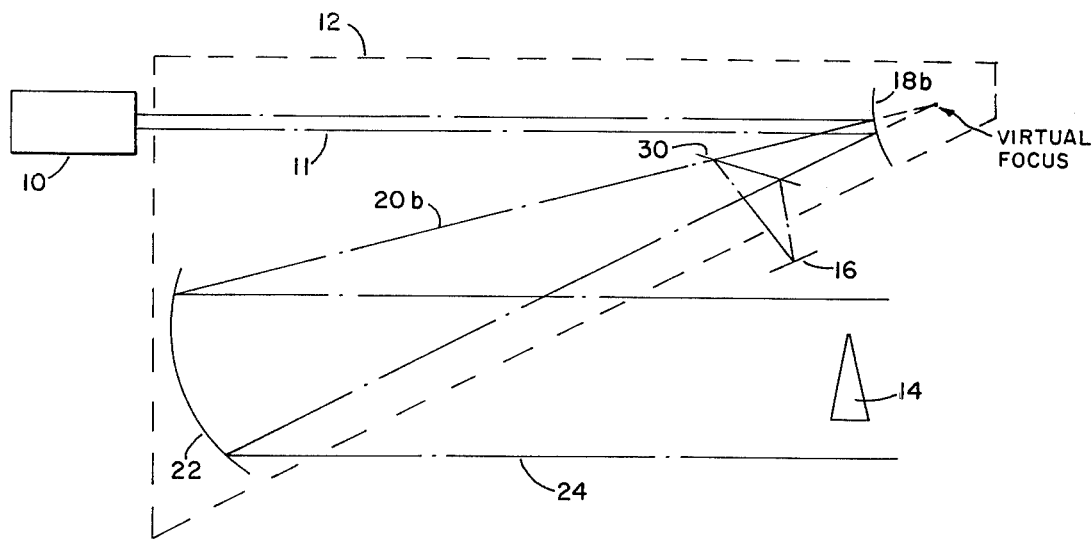
FIGS. 4 and 5 are other diagrammatic embodiments of reflective and transmissive optics according to this invention.
Figure 5:
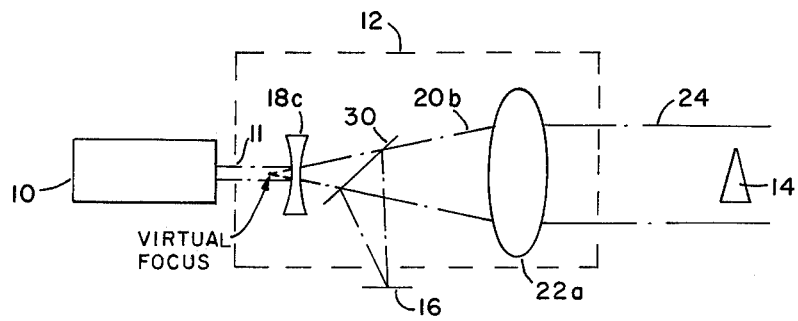

Referring now to FIGS. 4 and 5, other embodiments of reflective and transmissive optics are shown in which diverging mirror 18b of FIG. 4 has been substituted for converging mirror 18 and plate 26 of the FIG. 2 embodiment and diverging lens 18c of FIG. 5 has been substituted for converging lens 18a and plate 26 of FIG. 3. In these embodiments, diverging mirror 18b or diverging lens 18c are located so that there is one focal length from the virtual focus of beam 20b to converging mirror 22 or converging lens 22a. The far field image of the target is reflected back in the same manner as in the other embodiments.

The diverging substituted mirror or lens embodiments are preferable for high energy systems because there is no focus as with the pinholes of the embodiments in FIGS. 2 and 3.

I claim:

1. An optical reflective device comprising a laser source, a first optical device mounted to receive a laser beam from said laser source and transmit said laser beam in a back focal plane, a second optical device mounted for receiving said laser beam in said back focal plane in the front focal plane of said second optical device and transmitting said beam in a back focal plane, a target mounted in said back focal plane of said second optical device for receiving said laser beam from said second optical device, a detector mounted in an off-set front focal plane of said second optical device, and a beam splitter mounted relative to said first and second optical devices so that laser energy light reflected from said target back to said second optical device will be reflected by said beam splitter onto said detector in forms of far field pattern of said target.

2. An optical reflective device as set forth in claim 1, wherein said first optical device and said second optical device are converging mirrors.

3. An optical reflective device as set forth in claim 2, wherein said target is mounted approximately one focal length from said second optical device and said second optical device is mounted one focal length from the point of convergence of the laser beam in the back focal plane of said first optical device.

4. An optical reflective device as set forth in claim 3, wherein a plate with a pinhole therein is mounted at said point of convergence.

5. An optical reflective device as set forth in claim 1, wherein said first optical device and said second optical device are converging lenses.

6. An optical reflective device as set forth in claim 5, wherein said target is mounted approximately one focal length from said second optical device and said second optical device is mounted one focal length from the point of convergence of the laser beam in the back focal plane of said first optical device.

7. An optical reflective device as set forth in claim 6, wherein a plate with a pinhole therein is mounted at said point of convergence.

8. An optical reflective device as set forth in claim 1, wherein said target is mounted approximately one focal length from said second optical device and said second optical device is mounted one focal length from the virtual focus of the image reflected from said first optical device.

9. An optical reflective device as set forth in claim 8, wherein said first optical device is a diverging mirror and said second optical device is a converging mirror.

10. An optical reflective device as set forth in claim 8, wherein said first optical device is a diverging lens and said second optical device is a converging lens.

* * * * *